United States Patent Office 3,166,378
Patented Jan. 19, 1965

3,166,378
BORON HYDRIDE CARBONYL COMPOUNDS AND PROCESSES FOR MAKING THEM
Walter H. Knoth, Jr., Mendenhall, Pa., assignor to E. I. du Pont de Nemours and Company, Wilmington, Del., a corporation of Delaware
No Drawing. Filed June 28, 1962, Ser. No. 206,553
14 Claims. (Cl. 23—14)

This invention relates to a new class of boron hydride carbonyl compounds and to processes for making them.

Boron-hydrogen compounds have become technically important in recent years, especially as sources of high energy. Carbonyl compounds, including both metal carbonyls and organic carbonyl compounds, have long been valuable, the former as catalysts and volatile sources of pure metals, the latter as solvents and intermediates. To date, the only reported carbonyl compounds of boron hydrides are $BH_3CO$ and $B_4H_8CO$, both of which are unstable under ordinary conditions.

PRODUCTS OF THE INVENTION

There has now been made a new class of stable boron hydride carbonyl compounds that can be represented by the formula (1)       $B_{10}H_{8-m-n}X_mR_n(CO)_2$ in which X is halogen, preferably, chlorine, bromine, or iodine; R is hydrocarbyl; m is a cardinal whole number between 0 and 8, inclusive; n is 0, 1, or 2; and the sum of m and n is at most 8. When m is greater than 1, the groups represented by X can be the same or different. Similarly, when n is 2, the groups represented by R can be the same or different; thus, the formula can be written as $B_{10}H_{8-m-2}X_mRR'(CO)_2$ wherein m, X, and R are defined as above and R' is defined the same as R.

A subclass of products of the invention, preferred because they can be prepared in one step, and hereinafter referred to, therefore, as primary products, are compounds represented by Formula 1 in which m is zero. These products can be represented by the formula (2)       $B_{10}H_{8-n}R_n(CO)_2$ in which R and n are as defined above. They are prepared by reacting carbon monoxide with the bisdiazonium compound $B_{10}H_8(N_2)_2$ in the presence or absence of a hydrocarbon or a mixture of hydrocarbons. This process is described in detail below. The hydrocarbyl group or groups represented by R are those resulting from removal of a hydrogen from each reacting hydrocarbon.

Because their preparations involve fewer side reactions, products in which R is a hydrocarbyl group in which any unsaturation is aromatic are preferred, i.e., R may be alkyl, cycloalkyl, aryl, aralkyl, and alkaryl. Within this class R groups derived from hydrocarbons of 1-18 carbons are preferred. Examples are hydrocarbyl groups derived from methane, ethane, isobutane, octane, octadecane, cyclopropane, cyclopentane, methylcyclopentane, cyclodecane, p-menthane, cyclohexadecane, xylene, tert-butylbenzene, dodecylbenzene, naphthalene, biphenyl, phenanthrene, anthracene, and 9,10-dihydroanthracene. A more preferred class are groups derived from hydrocarbons of 1-10 carbons, especially cyclic hydrocarbons of 3-10 carbons.

Products of Formula 1 in which m is 1 or greater are prepared by halogenation of the primary products described above. In this process, which is described in detail below, one or more of the hydrogens bonded to boron are replaced by halogen.

PREPARATION OF THE PRIMARY PRODUCTS, $B_{10}H_{8-n}R_n(CO)_2$

As stated previously, the starting material for the preparation of products of Formula 2 is $B_{10}H_8(N_2)_2$, which can also be represented as $B_{10}H_8 \cdot 2N_2$. $B_{10}H_8(N_2)_2$ is prepared in three steps from decaborane, $B_{10}H_{14}$, as follows.

In the first step, decaborane is allowed to react with a lower dialkyl sulfide at a temperature of at least 0° C., and preferably at least 25° C., until approximately one mole of hydrogen per mole of decaborane is evolved. The product is a decaboryl bis(lower dialkyl sulfide), e.g., decaboryl bis(dimethyl sulfide), $B_{10}H_{12}[(CH_3)_2S]_2$. This process is described in detail in assignee's copending application Ser. No. 750,862, filed July 25, 1958.

The decaboryl bis(lower dialkyl sulfide) is then allowed to react with liquid ammonia at a temperature between about −50° C. and 0° C., and the product, $$(NH_4)_2B_{10}H_{10}$$

is isolated simply by evaporating the bis(lower dialkyl sulfide) that is formed, together with any excess, unreacted ammonia. This process is described in detail in assignee's copending application Ser. No. 6,853, filed February 5, 1960, now U.S. 3,148,938.

$B_{10}H_8(N_2)_2$ is produced from $(NH_4)_2B_{10}H_{10}$ by reaction with $NaNO_2/HCl$ in aqueous solution at 15° C. or lower, followed by reduction of the product (which is not isolated) with zinc and hydrochloric acid. The bis-diazonium compound is separated from the crude solid product by extraction with alcohol. This process is described in detail in assignee's copending application Ser. No. 186,270, filed April 9, 1962, now abondoned and refiled as continuation-in-part application Serial No. 324,885, filed on November 19, 1963.

As stated previously, the primary products of the invention, $B_{10}H_{8-n}R_n(CO)_2$ (Formula 2), are prepared by reacting carbon monoxide with $B_{10}H_8(N_2)_2$ in the presence or absence of a hydrocarbon or a mixture of hydrocarbons. Because of ease of separation of the products, it is preferred to use at most two hydrocarbons, and more preferably not more than one hydrocarbon. The compound $B_{10}H_8(CO)_2$ is the sole product when no hydrocarbon is present, and may also be formed when one or more hydrocarbons are used.

Widely varying mole ratios of the reactants can be used. To insure complete consumption of $B_{10}H_8(N_2)_2$, a $CO/B_{10}H_8(N_2)_2$ mole ratio of at least 2/1, as dictated by the stoichiometry of the reaction, is used. In practice, because of the carbon monoxide pressures that are conveniently employed, a large excess of carbon monoxide is used, e.g., mole ratios as high as several hundred to one. This presents no disadvantage, since carbon monoxide is cheap and readily available, and unused carbon monoxide can easily be separated and recycled.

When a hydrocarbon or a mixture of hydrocarbons is used, at least one mole, and usually at least 5 moles, of each hydrocarbon present per mole of $B_{10}H_8(N_2)_2$ is used. Upper limits on the amount of hydrocarbon are imposed only by reactor volume available and problems of recovery. The preferred mole ratio of hydrocarbon to $B_{10}H_8(N_2)_2$ is between 10:1 and 30:1.

The process can be carried out over a range of temperatures. At suitably high pressure, reaction can occur at as low a temperature as about 100° C. On the other hand, temperatures up to the decomposition point of the product can be used. For efficient operation, temperatures in the range 125–250° C. are used, temperatures of 135–175° C. being especially preferred.

Pressure is likewise not critical. The reaction can take place at atmospheric pressure, although for efficient operation it is desirable to use pressures of 200 atmospheres or higher. A preferred range is 500 to 1,000 atmospheres. Higher pressures, e.g., of several thousand atmospheres, can be used but confer no advantage.

A solvent is not required but can be used if desired. When a liquid hydrocarbon or a liquid mixture of two hydrocarbons are present as reactants, excess of these materials can function as solvent. Optionally, a liquid that either is inert or reacts only to the extent of furthering the desired reaction can be used. An example is iron pentacarbonyl.

Reaction begins immediately when the reactants are in contact at operable temperatures. Practical yields of the product can be realized in as short a time as 15 minutes, but the process can be continued for several hours if desired. A time of 0.5–3 hours usually suffices.

The process is carried out in conventional equipment used for conducting chemical reactions under pressure. At the end of the reaction period, the crude product or products are obtained by evaporating any relatively volatile material, and are purified by well-known procedures, e.g., distillation, sublimation, and crystallization.

PREPARATION OF PRODUCTS CONTAINING X GROUPS

A product of Formula 1 in which $m$ is 1 or greater is prepared by reacting a halogen or interhalogen with a compound of Formula 2. Reagents that can be used include, for example, the halogens chlorine, bromine, or iodine; and interhalogen compounds such as BrCl and ICl.

A preferred method of preparation, especially for compounds of Formula 1 where $m$ is $8-n$, is by reacting the appropriate halogen itself with a compound of Formula 2 in aqueous solution at temperatures of 0–100° C. Non-aqueous solvents, e.g., chloroform, carbon tetrachloride, or benzene, can be used if desired. Chlorination and bromination in aqueous solution take place readily at room temperature or below (0–30° C.), whereas iodination usually requires higher temperatures. The degree of halogenation can be controlled by varying the amount of halogen present. Usually the amount of halogen dictated by the stoichiometry of the reaction is employed. In the preparation of products of Formula 1 in which $m$ is $8-n$, an excess of halogen can be used. Because of the minimum of control thus required and the relative ease of separation of the products, these compounds constitute a preferred subclass. The time for the process can vary greatly and will depend on the halogen, the number of halogen atoms to be introduced, the concentrations of the reactants, and the temperature. It can vary from as little as a few minutes to as great as 24 hours. Most halogenations can be accomplished in from 0.5 to 5 hours, and this range of time is therefore preferred. The halogenated products can be isolated by evaporating the reaction solvent. The compounds $B_{10}H_{8-n}R_n(CO)_2$ exists in aqueous solution as the acids $(H_3O)_2B_{10}H_{8-n}R_n(COOH)_2$, and they are halogenated in aqueous solution in this form. (The reaction of the carbonyls with water to form carboxylic acids is discussed in more detail below.) The halogenated acids obtained in evaporation can be reconverted to the halogenated carbonyls by dehydration.

PROPERTIES OF THE PRODUCTS

The products of this invention are nonionic, crystalline solids. They are soluble in inert organic solvents, e.g., petroleum ether, benzene, ethyl ether, and chloroform, and with reaction in water.

In the infrared, the products exhibit absorption at about $4.6\mu$, characteristic of the carbonyl groups. The products containing B—H bonds have absorption characteristic of this linkage at about $3.9\mu$. The complete infrared absorption spectrum of $B_{10}H_8(CO)_2$ (potassium bromide pellet) shows the following bands: $3.92\mu$ (strong), (B—H), $4.3\mu$ (weak), $4.66\mu$ (very strong) (C≡O), $8.0\mu$ (weak), $8.25\mu$ (moderate), $8.5\mu$ (strong), $9.2\mu$ (weak), $9.5\mu$ (weak), $9.9\mu$ (weak), $10.35\mu$ (weak), $10.95\mu$ (moderate), $11.1\mu$ (weak), $11.35\mu$ (weak), $11.6\mu$ (moderate), $11.72\mu$ (weak), $13.98\mu$ (weak), $14.5\mu$ (moderate), and $15.0\mu$ (weak).

The products of this invention can exist in isomeric forms, corresponding to variations in the relative positions of the CO groups on the $B_{10}$ nucleus. At least two of the seven such isomers of $B_{10}H_8(CO)_2$ have been separated by gas chromatography.

The products of this invention have the important and useful property of being convertible to a wide variety of derivatives by reaction with reducing agents and water.

For example, on treatment with reducing agents such as lithium aluminum hydride, followed by decomposition of the primary products with water and by conventional ion-exchange reactions, the carbonyls,

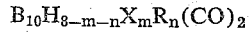
$$B_{10}H_{8-m-n}X_mR_n(CO)_2$$

are transformed into the acids,

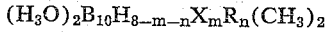
$$(H_3O)_2B_{10}H_{8-m-n}X_mR_n(CH_3)_2$$

(ionic formulation $(H_3O^+)_2[B_{10}H_{8-m-n}X_mR_n(CH_3)=]$, and their salts. The latter include metal salts, complex metal salts, ammonium salts, hydrocarbyl-substituted ammonium salts, phosphonium salts, and sulfonium salts, e.g., compounds in which the hydronium ions of the acids are replaced by cations such as cesium, calcium, thallium, lead, tetramminecopper (II), tris(ethylenediamine)cobalt (III), ammonium, dodecylammonium, piperidinium, dimethylanilinium, tetraethylammonium, tetramethylphosphonium, and trimethysulfonium.

The carbonyls $B_{10}B_{8-m-n}X_mR_n(CO)_2$ react with water, or with aqueous alkali followed by acidification, to give the tetrabasic, discarboxylic acids

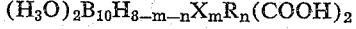
$$(H_3O)_2B_{10}H_{8-m-n}X_mR_n(COOH)_2$$

Like the acids of the previous paragraph, these acids are usually obtained as hydrates. (The formula for the completely anhydrous form of these acids, in which form they are rarely if ever obtained, is

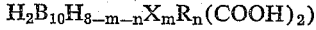
$$H_2B_{10}H_{8-m-n}X_mR_n(COOH)_2)$$

The reaction can be reversed by dehydration to give back the starting carbonyls. The acids can form both (a) salts containing the anion $[B_{10}H_{8-m-n}X_mR_n(COOH)_2]^=$, in which only the two hyronium ions have been replaced, and (b) salts containing the anion $$[B_{10}H_{8-m-n}X_mR_n(COO_2]^{4-}$$

in which all four ionizable hydrogens have been replaced. These salts can contain cations of the types described in the preceding paragraph.

Alternatively, the acids

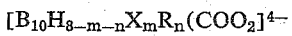
$$(H_3O)_2B_{10}H_{8-m-n}X_mR_n(COOH)_2$$

and their salts can be prepared from the corresponding acids 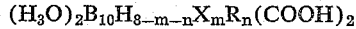 $(H_3O)_2B_{10}H_{8-n}R_n(COOH)_2$ and their salts by halogenation. For example, one or more of the hydrogens bonded to boron in compounds of the latter formula can be replaced by chlorine, bromine, or iodine by reaction with the appropriate halogen in aqueous solution.

The following examples illustrate the products and processes of this invention.

Example 1

$B_{10}H_8(N_2)_2$ (4.2 g.) and 50 ml. iron carbonyl were charged to a 100 cc., glass-lined, stainless-steel shaker tube. The tube was pressured with carbon monoxide, heated at 140° C. for 1½ hours at 1000 atm. pressure, and cooled. The reaction mixture was filtered, and the filtrate was evaporated. The residue was dissolved in benzene and filtered, and the filtrate was evaporated to give 2.5 g. of crude $B_{10}H_8(CO)_2$. The product was purified by sublimation at 80–120° C./0.1 mm.

*Analysis.*—Calcd. for $B_{10}H_8(CO)_2$: B, 62.7; C, 14.0; H, 4.6. Found: B, 62.9; C, 14.2; H, 4.8.

Example 2

One gram of $B_{10}H_8(N_2)_2$ was charged to the shaker tube of Example 1. The tube was pressured with carbon monoxide, heated at 140° C. for 1½ hours at 1000 atm. pressure, and cooled. The reaction product consisted of 0.85 g. of crystalline $B_{10}H_8(CO)_2$ containing a small amount of $B_{10}H_8(N_2)_2$. The $B_{10}H_8(CO)_2$ could be easily purified by extraction with water followed by filtration and evaporation of the filtrate to leave $B_{10}H_8(CO)_2$ as the residue. It was identified by infrared anaylsis.

Example 3

$B_{10}H_8(N_2)_2$ (3.3 g.) and cyclohexane (50 ml.) were charged to the shaker tube of Example 1. The tube was pressured with carbon monoxide, heated at 175° C. for 20 minutes at 1000 atm. pressure, and cooled. The clear liquid product was filtered, and the filtrate was concentrated until a thick oil was left. A small amount of crystalline $B_{10}H_8(CO)_2$ separated from this oil. It was removed by filteration, washed with hexamethyldisiloxane, and dried under vacuum.

*Analysis.*—Calcd. for $B_{10}H_8(CO)_2$: C, 14.0; H, 4.6. Found: C, 14.81; H, 5.0. The infrared spectrum of the product (mineral-oil mull) had a B—H band at 3.92μ and a C≡O band at 4.65μ.

The oil remaining from the separation of crystalline $B_{10}H_8(CO)_2$ was distilled at 90° C./0.5 mm.

$$B_{10}H_7C_6H_{11}(CO)_2$$

was obtained as a distillate ($C_6H_{11}$=cyclohexyl). It crystallized on standing.

Example 4

$B_{10}H_8(N_2)_2$ (5 g.) and 50 cc. cyclohexane were charged to the shaker tube of Example 1, which was then pressured with carbon monoxide, heated at 140° C. for 1½ hours at 1000 atm. pressure, and cooled. The crude reaction product was filtered, and the filtrate was evaporated to leave a yellow oil. This oil was further concentrated slowly until 0.7 g. of crystals formed. These were a mixture of $B_{10}H_8(CO)_2$ and $B_{10}H_7C_6H_{11}(CO)_2$ ($C_6H_{11}$=cyclohexyl) and were separated from the oil by filtration. The oil was extracted twice with hot water. The water-insoluble portion was $B_{10}H_6(C_6H_{11})_2(CO)_2$. For characterization, it was dissolved in 10% aqueous sodium hydroxide and treated with aqueous thallium nitrate to precipitate the solid tetrathallium derivative, $(Tl^+)_4[B_{10}H_6(C_6H_{11})_2(COO)_2]^{4-}$.

*Analysis.*—Calcd. for $Tl_4B_{10}H_6(C_6H_{11})_2(COO)_2$: Tl, 69.0; B, 9.1; C, 14.2; H, 2.4. Found: Tl, 66.4; B, 9.9; C, 13.3; H, 2.5.

The hot water extracts were evaporated and the residue was sublimed at 80–100° C./0.1 mm. to give 0.7 g. of crystalline $B_{10}H_7C_6H_{11}(CO)_2$, identical with the product of this formula described in Example 3.

*Analysis.*—Calcd. for $B_{10}H_7C_6H_{11}(CO)_2$: B, 42.5; C, 37.8; H, 7.1; M.W., 254. Found: B, 42.6; C, 37.2; H, 7.1; M.W., 268.

Other primary products of this invention are formed when other hydrocarbons are used in the process of the invention, e.g., when they are substituted for cyclohexane in the foregoing process. They are listed in the following table. $B_{10}H_8(CO)_2$ is also formed in each reaction.

| Hydrocarbon or Hydrocarbons Substituted for Cyclohexane | Products |
| --- | --- |
| Ethane | $B_{10}H_7C_2H_5(CO)_2$, $B_{10}H_6(C_2H_5)_2(CO)_2$. |
| Hexane | $B_{10}H_7C_6H_{13}(CO)_2$, $B_{10}H_6(C_6H_{13})_2(CO)_2$. |
| Methylheptane | $B_{10}H_7C_8H_{17}(CO)_2$, $B_{10}H_6(C_8H_{17})_2(CO)_2$. |
| Decane | $B_{10}H_7C_{10}H_{21}(CO)_2$, $B_{10}H_6(C_{10}H_{21})_2(CO)_2$. |
| Octadecane | $B_{10}H_7C_{18}H_{37}(CO)_2$, $B_{10}H_6(C_{18}H_{37})_2(CO)_2$. |
| Cyclopropane | $B_{10}H_7C_3H_5(CO)_2$, $B_{10}H_6(C_3H_5)_2(CO)_2$. |
| Cyclopentane | $B_{10}H_7C_5H_9(CO)_2$, $B_{10}H_6(C_5H_9)_2(CO)_2$. |
| Methylcyclohexane | $B_{10}H_7C_7H_{13}(CO)_2$, $B_{10}H_6(C_7H_{13})_2(CO)_2$. |
| Cyclodecane | $B_{10}H_7C_{10}H_{19}(CO)_2$, $B_{10}H_6(C_{10}H_{19})_2(CO)_2$. |
| Cyclooctadecane | $B_{10}H_7C_{18}H_{35}(CO)_2$, $B_{10}H_6(C_{18}H_{35})_2(CO)_2$. |
| Toluene | $B_{10}H_7C_7H_7(CO)_2$, $B_{10}H_6(C_7H_7)_2(CO)_2$. |
| Naphthalene | $B_{10}H_7C_{10}H_7(CO)_2$, $B_{10}H_6(C_{10}H_7)_2(CO)_2$. |
| Phenanthrene | $B_{10}H_7C_{14}H_9(CO)_2$, $B_{10}H_6(C_{14}H_9)_2(CO)_2$. |
| Cyclohexane+heptane | $B_{10}H_7C_5H_{11}(CO)_2$, $B_{10}H_7C_7H_{15}(CO)_2$, $B_{10}H_6(C_6H_{11})_2(CO)_2$, $B_{10}H_6(C_7H_{15})_2(CO)_2$, $B_{10}H_6(C_6H_{11})(C_7H_{15})(CO)_2$. |
| Pentane+cyclooctane | $B_{10}H_7C_5H_{11}(CO)_2$, $B_{10}H_7C_8H_{15}(CO)_2$, $B_{10}H_6(C_5H_{11})_2(CO)_2$, $B_{10}H_6(C_8H_{15})_2(CO)_2$, $B_{10}H_6(C_5H_{11})(C_8H_{15})(CO)_2$. |

Example 5

$B_{10}H_8(N_2)_2$ (3.0 g.) and 50 ml. decahydronaphthalene were charged to the shaker tube of Example 1, which was then pressured with carbon monoxide, heated at 175° C. for 20 minutes at 1000 atm. pressure, and cooled. The crude reaction mixture was a cloudy, pale yellow liquid. It was filtered and evaporated to leave a viscous oil. The remaining traces of decalin were removed at 40° C./0.02 mm., to give $B_{10}H_7C_{10}H_{17}(CO)_2$ ($C_{10}H_{17}$=decahydronaphthyl)

as an oil.

Example 6

$B_{10}H_8(N_2)_2$ (3.0 g.) and 40 ml. benzene were charged to the shaker tube of Example 1, which was then pressured with carbon monoxide, heated at 1000 atm. pressure and 140° C. for 1½ hours, and cooled. The reaction mixture was filtered, and the filtrate was evaporated to leave an orange-red solid. This was extracted with petroleum ether. Evaporation of the extracts left a solid, which was dissolved in a mixture of carbon tetrachloride and cyclohexane. The solvent was slowly evaporated until a slurry of crystals formed. These were removed to give a mixture containing $B_{10}H_7C_6H_5(CO)_2$.

*Analysis.*—Calcd. for $B_{10}H_7C_6H_5(CO)_2$: C, 38.7; H, 5.6. Found: C, 33.2; H, 5.1.

Example 7

$B_{10}H_8(CO)_2$ (0.7 g.) was dissolved in 15 ml. of water, and chlorine was passed into the solution with cooling in an ice bath for 30 minutes. The ice bath was removed, and addition of chlorine was continued at room temperature. Aliquot samples of the solution were removed periodically and mixed with aqueous tetramethylammonium chloride to precipitate tetramethylammonium salts of the anions present. When a precipitate showing no infrared absorption for B—H was formed, chlorination was stopped, and the reaction solution was evaporated to leave a yellowish solid. Part of this solid was recrystallized from water and dried under vacuum (1 mm.) at 25° C. for 24 hours to give $$(H_3O)_2B_{10}Cl_8(COOH)_2 \cdot 3H_2O$$

*Analysis.*—Calcd. for $(H_3O)_2B_{10}Cl_8(COOH)_2 \cdot 3H_2O$: B, 18.8; C, 4.2; H, 2.4. Found: B, 18.6; C, 4.6; H, 3.0.

The identity of the product was confirmed by conversion of the remainder of the yellowish solid to the corresponding tetramethylammonium salt through reaction with aqueous tetramethylammonium chloride. The salt was recrystallized from water.

Analysis.—Calcd. for $[(CH_3)_4N]_2B_{10}Cl_8(COOH)_2$: B, 17.1; C, 19.1; H, 4.1; Cl, 45.1. Found: B, 16.9; C, 19.3; H, 4.5; Cl, 43.8.

A hydrate of $(H_3O)_2B_{10}Cl_8(COOH)_2$ was prepared essentialy as above by dissolving $B_{10}H_8(CO)_2$ (2 g.) in 50 ml. water, bubbling chlorine into the solution for 45 minutes with cooling in an ice bath and then for three hours at room temperature, and evaporating the water. Sublimation of the residual acid hydrate at 140° C./0.1 mm. gave a crystalline solid with infrared bands for both $C\equiv O$ and $C=O$. Sublimation at 300° C. and atmospheric pressure gave solid, crystalline $B_{10}Cl_8(CO)_2$. The product was characterized by its infrared absorption spectrum, which had a strong $C\equiv O$ band at $4.55\mu$.

Additional examples of halogenated products of this invention that can be prepared by the process set forth in Example 8 from the primary products of the invention, exemplified in Examples 1–6 and in Table I, include the following:

$B_{10}Br_8(CO)_2$, $B_{10}I_8(CO)_2$, $B_{10}H_7Cl(CO)_2$
$B_{10}H_5Br_3(CO)_2$, $B_{10}H_6I_2(CO)_2$, $B_{10}H_2I_5C_6H_{11}(CO)_2$
$B_{10}H_2Br_4(C_6H_{11})_2(CO)_2$, $B_{10}H_6IC_6H_5(CO)_2$
$B_{10}Br_7C_{10}H_{17}(CO)_2$, $B_{10}I_7C_2H_5(CO)_2$
$B_{10}H_3Cl_3(C_{10}H_{21})_2(CO)_2$, $B_{10}Cl_7C_{18}H_{37}(CO)_2$
$B_{10}Br_6(C_5H_9)_2(CO)_2$, $B_{10}H_2Cl_5C_{10}H_{19}(CO)_2$
$B_{10}H_6BrC_{10}H_7(CO)_2$, $B_{10}Cl_6(C_6H_{11})(C_7H_{15})(CO)_2$
$B_{10}Br_6(C_5H_{11})(C_8H_{15})(CO)_2$, and
$B_{10}H_4I_2(C_6H_{11})(C_7H_{15})(CO)_2$ The corresponding halogenating agents used in place of the $Cl_2$ of Example 7 include, bromine, iodine, N-halosuccinimides and interhalogen compounds.

The products of this invention are useful in the preparation of shaped resistors from cellulosic materials. The following example is illustrative:

Example A

A piece of cotton string was soaked in an approximately 15% solution of $B_{10}H_8(CO)_2$ in acetone and removed, and the acetone in the string was evaporated, leaving the string uniformly impregnated with $B_{10}H_8(CO)_2$. The string was burned, to give a residual object that retained the original shape of the string and could be handled without disintegrating. When a portion of the product thus formed was placed on a solid paraffin-wax support between two electrodes, it was found to have a resistance of 120,000 ohms per inch.

The products of this invention are also useful as components of fireworks compositions to impart a pleasing color and sparkle to the display.

This application is a continuation-in-part of my copending application Ser. No. 186,270, filed April 9, 1962, which in turn is a continuation-in-part of my application Ser. No. 135,710, filed August 24, 1961, now abandoned, which in turn is a continuation-in-part of my application Ser. No. 6,852, filed February 5, 1960, now abandoned.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A compound of the formula $$B_{10}H_{8-m-n}X_mR_n(CO)_2$$

wherein X is halogen, R is hydrocarbyl of up to 18 carbon atoms wherein any unsaturation is aromatic, $m$ is a whole number of from 0 to 8, inclusive, and $n$ is an integer of from 0 to 2, inclusive, the sum of $m$ and $n$ being at most 8.

2. The compound of claim 1 wherein $n$ is 2.
3. A compound of claim 2 wherein R is cyclic and contains 3 to 10 carbon atoms.
4. A compound of the formula $$B_{10}H_{8-n}R_n(CO)_2$$

wherein R is hydrocarbyl of up to 18 carbon atoms free of aliphatic unsaturation, and $n$ is an integer of from 0 to 2, inclusive.

5. A compound of the formula $$B_{10}H_{8-m}X_m(CO)_2$$

wherein X is halogen and $m$ is a cardinal number of from 0 to 8, inclusive.

6. $B_{10}H_8(CO)_2$.
7. $B_{10}H_7C_6H_{11}(CO)_2$.
8. $B_{10}H_6(C_6H_{11})_2(CO)_2$.
9. $B_{10}H_7C_6H_5(CO)_2$.
10. $B_{10}Cl_8(CO)_2$.
11. Process for preparing $B_{10}H_8(CO)_2$ which comprises reacting $B_{10}H_8\cdot 2N_2$ with CO.
12. Process of claim 11 wherein the process is carried out at a temperature of from 100° C. to 250° C.
13. Process for preparing $B_{10}H_{8-n}R_n(CO)_2$ wherein R is hydrocarbyl of up to 18 carbon atoms free of aliphatic unsaturation and $n$ is an integer of from 1 to 2, inclusive, which comprises reacting $B_{10}H_8\cdot 2N_2$ with CO and a reagent selected from the class consisting of hydrocarbon and a mixture of hydrocarbons, and isolating the resulting product.
14. Process for preparing a compound of the formula $$B_{10}H_{8-m-n}X_mR_n(CO)_2$$

wherein X is halogen, R is hydrocarbyl of up to 18 carbon atoms free of aliphatic unsaturation, $m$ is a whole number from 1 to 8, inclusive, $n$ is an integer of from 0 to 2, inclusive, the sum of $m$ and $n$ being at most 8, which comprises reacting a compound of the formula $$B_{10}H_{8-n}R_n(CO)_2$$

with a halogenating agent selected from the class consisting of halogen and interhalogen.

No references cited.